United States Patent [19]

Amikura et al.

[11] 4,208,108
[45] Jun. 17, 1980

[54] SOUND MOTION PICTURE PROJECTOR

[75] Inventors: Takashi Amikura, Hon; Yutaka Kohtani, Yokohama; Kiyoshi Takahashi, Kunitachi, all of Japan

[73] Assignee: Canon Kabushiki Kaisha, Tokyo, Japan

[21] Appl. No.: 858,799

[22] Filed: Dec. 8, 1977

[30] Foreign Application Priority Data

Dec. 13, 1976 [JP] Japan .................... 51/149545

[51] Int. Cl.² ............................................. G03B 31/02
[52] U.S. Cl. .......................................... 352/27; 360/3; 360/13
[58] Field of Search ................................. 352/5–9, 352/27, 25, 26, 129, 133, 10; 360/3, 13, 18, 22, 24, 61, 63; 353/19

[56] References Cited

U.S. PATENT DOCUMENTS

| 2,633,055 | 3/1953 | Badmaieff | 360/3 X |
|---|---|---|---|
| 2,962,927 | 12/1960 | Warren | 360/3 X |
| 3,012,105 | 12/1961 | Bach | 360/3 X |
| 3,452,161 | 6/1969 | Hafler | 360/3 |
| 3,682,363 | 8/1972 | Hull | 360/13 X |
| 3,778,558 | 12/1973 | Wick et al. | 360/13 |
| 3,989,361 | 11/1975 | Gross | 352/27 X |
| 4,097,906 | 6/1978 | Schild et al. | 360/3 |

FOREIGN PATENT DOCUMENTS 2363764  6/1975  Fed. Rep. of Germany ............. 352/5

Primary Examiner—L. T. Hix
Assistant Examiner—William B. Perkey
Attorney, Agent, or Firm—Toren, McGeady and Stanger

[57] ABSTRACT

In the disclosed motion picture projector the original sound recorded on the main magnetic stripe along one edge of a film stripe also having a magnetic balance stripe along the other edge of the same film surface, is reproduced by a recording-reproducing head. A second recording-reproducing head records the signal on the balance stripe. While the original sound signal is being heard, the first recording-reproducing head overlaps a second sound signal on the main stripe. A part of the original sound signal on the main stripe may be erased and a new signal recorded in its place.

21 Claims, 3 Drawing Figures

SOUND MOTION PICTURE PROJECTOR

BACKGROUND OF THE INVENTION

1. Field of the Invention

The present invention relates to a sound motion picture projector.

2. Description of the Prior Art

There are many films for recording both image data and sound. There are two methods for recording sound on the film, namely optically and magnetically. In accordance with the former it is impossible to erase the sound recorded on the film or to record a new sound thereon. In accordance with the latter the original sound can easily be erased, and new sound can easily be recorded. Moreover, the new sound can easily be made to overlap the original sound.

However, until several years ago, 8 mm films on which sound information was recorded magnetically had not yet been brought on the market so that the sound information was recorded on the films optically. Consequently, all sound motion picture projectors for the 8 mm size film reproduced sound optically.

Quite recently 8 mm sized films on which the sound can be recorded magnetically have been brought on the market under the trade name "Sound Movie Film" by Eastman Kodak Company, U.S.A. sound motion picture cameras by which sound information can be recorded magnetically as well as sound motion picture projectors by which sound information can be reproduced magnetically have also been actively developed.

As is disclosed in U.S. Pat. No. 3,858,968, the aforementioned sound movie film has a main stripe of magnetic recording material along one side edge of one surface of the film and a balance stripe of magnetic recording material along the other side edge of the same surface; The balance stripe is located adjacent to a series of perforations in the film while the light sensitive emulsion on the film is usually located on the opposite (lower side) surface of the film.

The reason why this film is provided with a balance stripe beside the main stripe is that if only the main stripe is coated on the base material of film, the wound up film coil slants. Thus in order to compensate for the difference in thickness between both edges of the film, the balance stripe is coated.

Consequently, the sound information is normally recorded only on the main stripe serves while the balance stripe exclusively to compensate for the difference in thickness between both edges, not to record the sound information. This is not because sound information can not be recorded on the balance stripe but because the width of the balance stripe is so small as compared with that of the main stripe that the quality of the reproduced sound is inferior when the sound is recorded on the balance stripe. Thus, it is also possible for sound information to be recorded on the balance stripe if the lowering of the sound quality is disregarded. A motion picture system in which the sound information is recorded on both the main stripe and the balance stripe is disclosed, for example, in DOLS 2,417,095. In accordance with the application disclosed in DOLS 2,417,095, the image information is first recorded on a film on whose main stripe the sound information supplies the background-music, while the sound information corresponding to the above image information is recorded on the balance stripe. Then, making use of an editor having a recording-reproducing head corresponding to the main stripe and the balance stripe of the film, the sound edition is made by overlapping the sound recorded on the balance stripe on the sound such as a background-music recorded in advance on the main stripe, or a part of the sound information on the main stripe is deleted and in its stead the sound information on the balance stripe is recorded.

It is normal in the field of tape recording that the sound edition is made by repeatedly recording sound information over what is already recorded on a tape. This editing method is called "sound on sound" or "sound with sound".

In accordance with the "sound on sound" method applied in the field of tape recording, the sound information recorded in advance on the first track of the magnetic tape is reproduced by means of the recording-reproducing heat reproducing the first track into an audible signal. This signal is newly recorded, further overlapped with a bias current and delivered to the recording-reproducing head provided for the second track of the magnetic tape so as to be recorded on the second track. Thus the original signal and the newly-recorded are synchronized with each other, and in reproduction the both signals on the second track are heard by reproducing the mixed signals. On the other hand, in accordance with the "sound with sound" method the original sound signal on the first track is reproduced by means of the first recording-reproducing head into an audible signal, while at the same time a newly-recorded sound signal is overlapped with a bias current and delivered to the second recording-reproducing head provided for the second track of the magnetic tape. Thus the newly-recorded signal a signal to be recorded is recorded on the second truck in is synchronized with the original signal. At the time of reproduction the sound information on the first and second track are reproduced simultaneously such that both signals are audible, being mixed with each other. However, in case of the "sound on sound" method and the "sound with sound" method applied in the field of tape recording, it is necessary, as mentioned above, that the magnetic tape include at least two tracks. These methods are not applicable to a device including only one track.

However, the aforementioned magnetic recording film on which the sound and the image are recorded so small in the has such a narrow width of the main stripe that only one track can be constituted. Thus it is impossible to apply the "sound on sound" method or the "sound with sound" method as in the field of tape recording, as a sound editing method. Consequently in the case of the conventional sound motion picture projector the demagnetizing head and the recording-reproducing head are provided in sequence from the film fowarding direction along the film running path. For "double recording" the demagnetizing head inoperative and a new sound information signal overlapped with a bias current is delivered to the recording-reproducing head. For a "complete deletion recording" both the demagnetizing head and the recording-reproducing head are operative. In the case of "double recording", when the film passes through the position at which the demagnetizing head is arranged, the original sound information signal recorded on the main stripe of the film is deleted. Then the new sound information signal is recorded on the main stripe when the film passes through the position at which the recording-reproducing head is arranged.

However, in order to carry out the "double recording" or the "complete deletion recording" the afore mentioned conventional sound motion picture projector, it is necessary to find out, by means of a flair, the position at which the "double recording" or the "complete deletion recording" is to be carried out. This is because the picture projector is not designed to produce an audible signal from the already-recorded sound to indicate when new sound information may be recorded. Consequently, with a wrong mark, the necessary sound information is apt to be deleted by mistake or unnecessary sound information remains undeleted in the case of the "complete deletion recording", which is inconvenient. In the case of "double recording", a double recording with wrong timing is obtained, which is also inconvenient. Thus, it is remarkably difficult to use the projector for correct sound edition, which is problematic.

It might be possible to solve the problem of sound edition with the conventional sound motion picture projector with just one magnetic recording means. A previously recorded track could be reproduced into an audible signal, indicating when new sound information should be supplied. For example one might arrange the reproducing head, the demagnetizing head and the recording head in sequence from the forwarding direction of film. Thus for "complete deletion recording" the original sound signal is reproduced my means of the reproducing head, then deleted by means of the demagnetizing head. While the reproduced signal is being heard it is mixed with the new signal to be recorded, overlapped with a bias current and then delivered to the recording head provided behind the demagnetizing head. Thus the new signal is recorded in synchronization with the original signal. In the case of the "double recording" demagnetizing head is operative. The sound signal recorded in advance is heard through the reproducing head while the signal new is overlapped with a bias current and delivered to the recording head so that original the signal and the new signal are recorded on film, in synchronization. However, the above system can not be applied to the sound motion picture projector for which the relative position between the picture and the sound has been determined because the position of the original sound signal before "sound on sound" is displaced from the position at which the new signal is recorded by the distance between the reproducing head and the recording head.

SUMMARY OF THE INVENTION

A first purpose of the present invention is to offer a sound motion picture projector particularly capable of using a film strip having the main stripe of magnetic recording material along the one side edge of one surface of the film and the balance stripe of magnetic recording material along the other side edge of the same surface, so designed that a sound edition can be carried out in a simple way free from the lag between the picture and the sound or the incorrect sound edition.

A second purpose of the present invention is to offer a second motion picture projector particularly capable of using a film with a main and balance stripe of of magnetic recording material along the one edge of one surface of the film and the balance stripe of magnetic recording material along the other edge of the same surface of the film, which permits realizing an easy and correct sound edition. This is facilitated by reproducing a first sound signal recorded in advance on the main stripe by means of the first recording-reproducing head at a position corresponding to the main stripe, and reproducing the first sound signal by means of the second recording-reproducing head at a position corresponding to the main and balance stripes, respectively. While the first sound information signal is being heard from the balance stripe, a new sound signal can be overlapped onto the original signal on the main stripe, by means of the first recording-reproducing head. In another embodiment at least a part of the first sound information signal on the main stripe is completely deleted and new sound information can be recorded on the part on which sound has been deleted.

A third purpose of the present invention is to offer a sound motion picture projector capable of easy sound edition by operating a operation member.

Further other purposes of the present invention will be clear out of the following explanations and the accompanying drawings.

DESCRIPTION OF THE PREFERRED EMBODIMENT

Below an embodiment of the sound motion picture projector of the present invention will be explained in accordance with the accompanying drawings.

Figure 1:
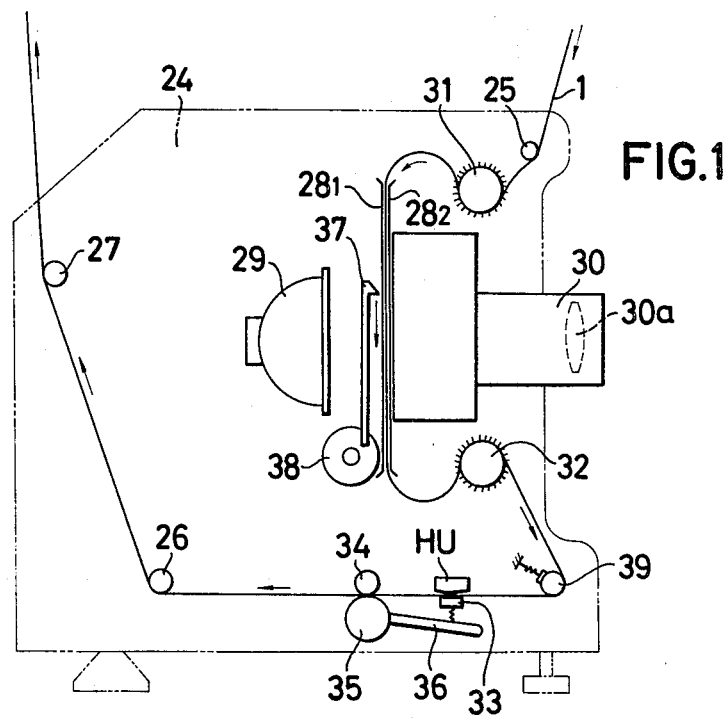
FIG. 1 represents a plane view of the arrangement of the important members in the sound motion picture projector of the present invention.
Figure 2:
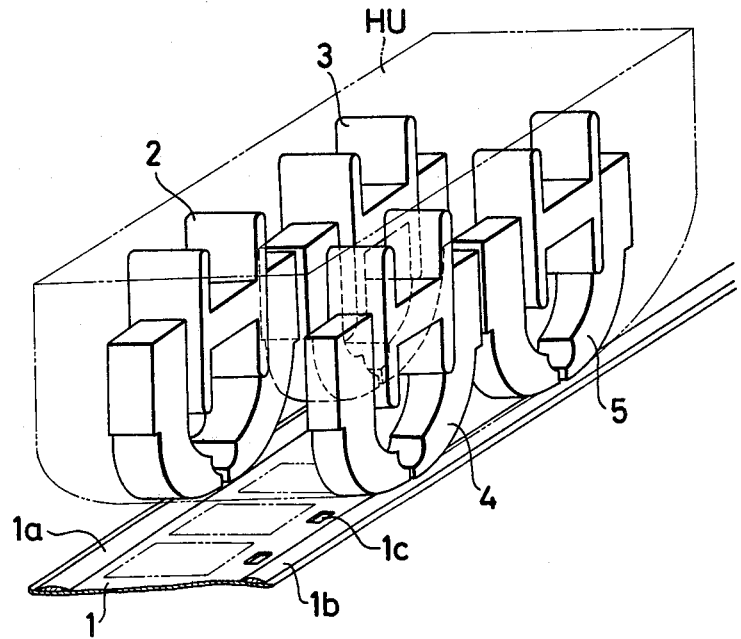
FIG. 2 represents the head unit in perspective view to be used in the sound motion picture projector of the present invention.

In FIG. 1, 24 represents a projector body, while 25, 26 and 27 represent film guide rollers rotatably held in the projector body 24. A film gate, 28 is formed by plates $28_1$ and $28_2$, and a projector lamp is represented by 29. A lens construction 30 contains a projection lens 30a. Upper and lower sprockets are represented by 31 and 32, respectively. The construction of a head unit, HU, is shown in FIG. 2 in detail. A pad 33 is arranged opposite the head unit HU. A capstan 34 is arranged opposite a pinch roller 35. Displacing member 36 is coupled with the pinch roller 35 and the pad 33 so that it can be operated from the outside between the first position (FIG. 1) in which the capstan 34 and the head unit HU are in resilient contact with the pinch roller 35 and the pad 33, and the second position in which they are separated. A film-pulling claw 37 intermittently feeds the film at the film gate ($28_1$, $28_2$) and is actuated by device 38. Roller 39 forms roller for forming a film loop between the film gate ($28_1$, $28_2$) and the capstan 34 and the pinch roller 35. In this projector, a film 1 runs through the roller 25, the upper sprocket 31, the film gate 28, the lower sprocket 32, the roller 39, the head unit HU and the pad 33, the capstan 34 and the pinch roller composing the one film feed means, the roller 26 and the roller 27. Although not shown in the drawing, the projector is provided the upper sprocket 31, the lower sprocket 32, the film pull-down claw 37 composing the other film feed means and a conventional means for actuating the capstan 34 rotating at a constant speed. The film 1 is intermittently fed by means of the film-pulling claw 37 at the film gate 28, while between the capstan 34 and the pinch roller 35, the film 1 is fed at a constant speed. Further, in this projector the size of the loop between the capstan 34 and the pinch roller 35, and the film pulling claw 37 is detected by means of the loop forming roller 39. Thus the projector is provided with a means for regulating the intermittent film feed speed by means of the film pulling claw 37 or the continuous film feed speed by means of the capstan 34 and the pinch roller 35 based upon the loop size as detected by the roller 39.

Figure 3:
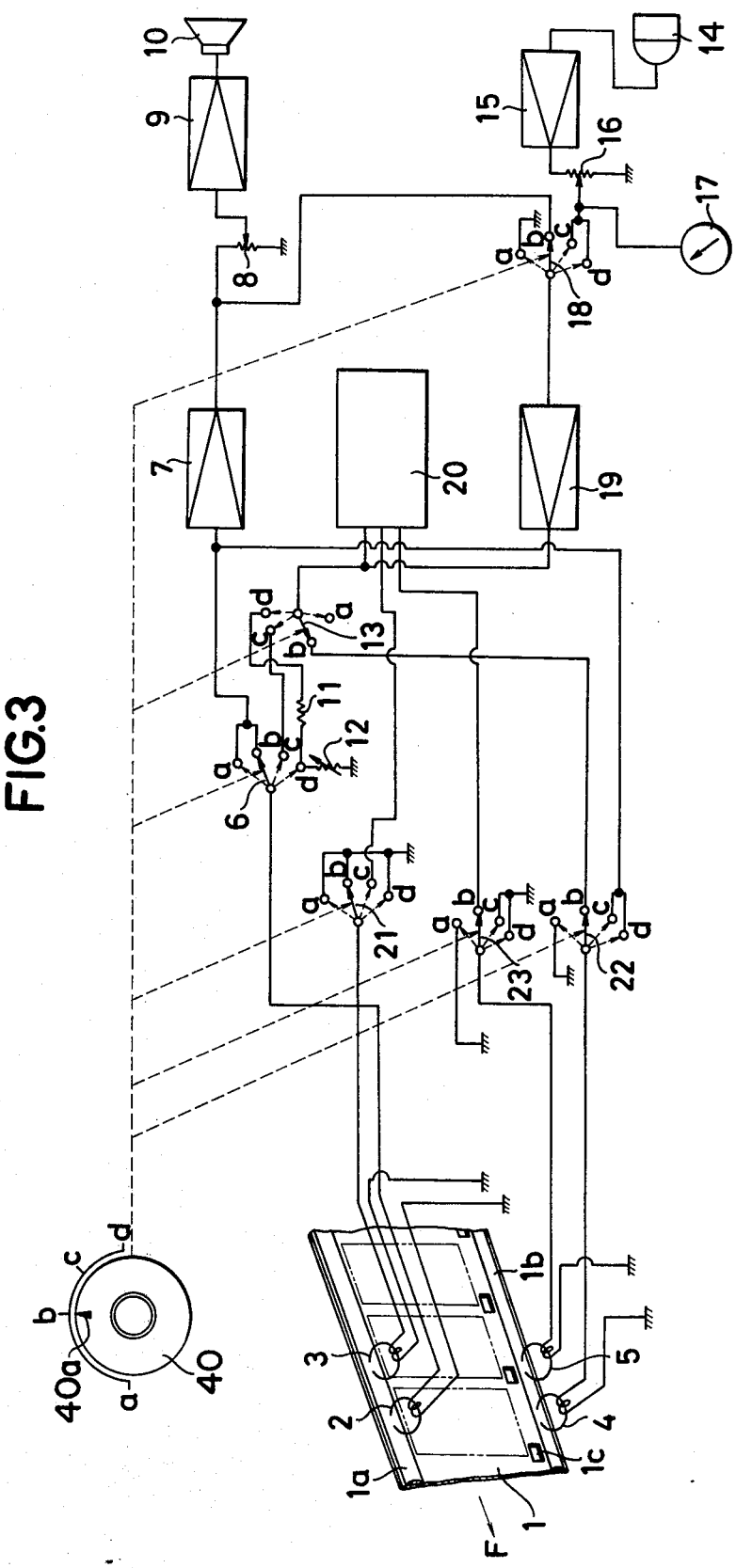
FIG. 3 represents the film to be used in the sound motion picture of the present invention and the electrical circuit adapted to the projector.

As is shown in FIGS. 2 and 3, the film stripe 1 has a main stripe 1a of magnetic recording material along one side edge of its surface and a balance stripe 1b of magnetic recording material along the other side edge of the same surface. The balance stripe 1b is located adjacent to a series of perforations 1c in the film 1.

This film 1 is disclosed for example in U.S. Pat. No. 3,858,968. The control circuit of the sound motion picture projector of the present invention is represented in FIG. 3. A recording-reproducing magnetic head 2 is arranged at a position corresponding to the principle magnetic stripe 1a of the film 1, when the film 1 runs. A demagnetizing head 3 is arranged at a position corresponding to the principle magnetic stripe 1a so as to be parallel to the magnetic head 2. A recording-reproducing magnetic head 4 is arranged at a position corresponding to the balance stripe 1b of the film when the film 1 runs, while 5 represents a demagnetizing head arranged at a position corresponding to the balance stripe 1b of the film 1 so as to be parallel to the magnetic head 4. As is shown in FIG. 2, the magnetic heads 2, 3, 4 and 5 are formed as a single head unit. Further, the film 1 is fed along the arrow F in FIG. 3 in the normal projection. Mode selector or 6, 13, 18, 21, 22 and 23 are the mode change over switches 6, 13, 18, 21, 22 and 23 are operatively engaged to each other so as to be controlled by operating a mode selector or change over dial 40 on the outer surface of the projector body 24. The switches 6, 13, 18, 21, 22 and 23 respectively can be selectively moved to a contact a to bring the recording-reproducing device of the sound motion projector into a reproduction mode, to the contact b to bring the device into a transfer mode, to the contact c to bring the device into a recording mode and to the contact d to bring the device into the double recording mode. These switches 6, 13, 18, 21, 22 and 23 are operatively engaged to be selectively moved to the contacts a, b, c and d by setting a finger of mark 39a of the selector dial 40 to the marks, "a", "b", "c", and "d" on the projector body 24.

An amplifier 7 amplifies the sound information signals coming from the head 2 or 4. A sound volume adjusting variable resistor 8 is operable from outside. An amplifier is represented by 9, while a speaker is represented by 10. a resistance, while 12 is a variable resistance, whereby By means of a or 11 and a variable resistor 12 the ratio of the original sound information signal (recorded in advance on the principal magnetic stripe 1a) to the second sound information signal (to be overlapped on the first) is adjusted. This adjustment is carried out by operating the variable resistance 12 from the outside. A microphone 14 supplies input of the newl-recorded sound information signal; An amplifier 15 amplifies the sound information signal from the microphone 14, while a variable resistor 16 adjusts the sound volume, by varying the input level of the sound information signal from the microphone 14. A recording level display device 17, such as a meter, displays the recording level. A principal amplifier is represented by 19. A high frequency oscillator 20 produces a bias current as well as a demagnetizing current.

The following occurs for the sound motion picture projector constructed as stated above in accordance with the present invention:

(a) When the index 40a of the switching dial 40 is set at the mark "a" on the projector body 24, each of the switches 6, 13, 18, 21, 22 and 23 is moved to the contact a in FIG. 3. Thus the connection of the demagnetizing heads 3, 5 to the high frequency oscillator 20 is interrupted so that the demagnetizing heads 3, 5 are inoperative together with the sound recording-reproducing head 4. Only the sound recording-reproducing head 2 is in the operable such that the sound signal recorded on the main stripe 1a is reproduced by means of the head 2 and reproduced into an audible signal by means of a speaker 10 through the switch 6, the amplifier 7, the resistor 8 and the amplifier.

(b) When the index 40a is set at the mark "b" also in operative engagement with the switching dial 39 each of the switches 6, 13, 18, 21, 22 and 23 is moved to the contact b in FIG. 3. The connection of the demagnetizing head 3 to the oscillator 20 is interrupted. Therefore the demagnetizing head 3 is inoperative while the demagnetizing head 5 is connected to the oscillator 20. In this case the sound signal recorded on the main stripe 1a is reproduced by means of the head 2, converted into an audible signal by means of the speaker 10 through the switch 6, the amplifier 7, the resistor 8 and the amplifier 9 and at the same time input through the switch 18, the amplifier 19, the switch 13 and the switch 22 into the head 4, by means of which it is recorded on the balance stripe 1b. The demagnetizing head 5 is in operative state and therefore all the signal on the balance stripe 1c is cleared before the signal on the main stripe is recorded on the balance stripe 1b by means of the head 4 in such a manner that the signal is recorded on the renewed main stripe 1a, whereby the signal on the main stripe 1a is recorded on the balance stripe 1b, while the sound signal on the main stripe 1a is being heard through the speaker 10;

(c) When the index 40a is set at the mark "c", in operative engagement with the switching dial 39 each of the switches 6, 13, 18, 21, 22 and 23 is moved to the contact c in FIG. 3. In this state the demagnetizing head 3 is connected to the oscillator 20. The connection of the demagnetizing head 5 to the oscillator 20 is thus interrupted and the demagnetizing head 5 is inoperative. The sound signal recorded on the balance stripe 1b is reproduced by means of the head 4, converted into an audible signal by means of the speaker 10 through the switch 22, the amplifier 7, the resistor 8 and the amplifier 9. The electrical signal converted from the audible sound information by means of the microphone 14 is input through the amplifier 15, the resistor 16, the switch 18, the amplifier 19 and the switches 13, 6 into the head 2. By means of head 2 the electrical signal is recorded on the main stripe 1a, while the level of the signal input into the head 2 from the microphone 14 is displayed on the meter 17. whereby The demagnetizing head 3 is operative and therefore the signal recorded on the main stripe 1a is cleared before a new signal from the microphone 14 is recorded on it. Thus the new signal coming from the microphone 14 is recorded on the main stripe 1a while the sound signal on the balance stripe 1b is being heard through the speaker 10. and (d) When the index 40a is set at the mark "d", in operative engagement with the switching dial 39 each of the switches 6, 13, 18, 21, 22 and 23 is moved to the contact d in FIG. 3 In this state the connection of the demagnetizing heads 3, 5 to the oscillator 20 is interrupted and therefore the heads 3, 5 are inoperative. The sound signal recorded on the balance stripe 1b is reproduced by means of the head 4 and converted into an audible signal by means of the speaker 10 through the switch 22, the amplifier 7, the resistor 8 and the amplifier 9. The sound signal from the microphone 14 is delivered to the head 2 through the amplifier 15, the resistor 16, the switch 18, the amplifier 19, the switch 13, the resistor 11 and the switch 6. In this state the demagnetizing head 3 is inoperative and therefore the input signal from the microphone 14 is overlapped on the original signal, so that a new signal from the microphone is recorded on the main stripe 1a while the sound signal on the balance stripe 1b is being heard.

For a sound motion picture projector constructed in accordance with the present invention, the composition method of the sounds recorded in the main stripe on the film in a sound motion picture camera is divided into:

(1) "double recording" in which on a film on which a sound has been recorded, background music, a narration, and so on are recorded;

(2) "insert recording" in which only a part of original sound information signal on the main stripe 1a of a film is deleted and in its stead a music or narration is newly recorded and so on.

In the case of the sound motion picture projector in accordance with the present invention, all of the above recordings are possible by operating the mode switching dial 39. The operation of the sound motion picture projector in accordance with the present invention will be explained below in detail in accordance with FIG. 3.

(1) Double recording in which on the original sound information signal recorded on the main magnetic stripe 1a of the film 1, another sound information signal such as music, narration or the like is recorded.

In this case, by operating the mode selector or switching dial 40 so as to set the index 40a at the mark "b" on the main body, each of the selector switches 6, 13, 18, 21, 22 and 23 is moved to the contact b. In this mode, only the demagnetizing head 3 is inoperative, while the recording-reproducing heads 2 and 4 as well as the demagnetizing head 5 are operative. In consequence the original sound information signal on the main magnetic stripe 1a is reproduced by means of the recording-reproducing magnetic head 2, input through the switch 6, the contact b to the amplifier 7 and, after having been further amplified by means of the main amplifier 9, input into the speaker 10 to be converted into an audible signal. At the same time the signal coming from the amplifier 7 is amplified by the amplifier 19 through the switch 18, the contact b, overlapped with the bias current coming from the high frequency oscillator 20 and delivered to the recording-reproducing head 4 through the switch 13, the contact b and the switch 22, contact b and recorded on the balance magnetic stripe 1b. Further, in this state the demagnetizing current is supplied to the demagnetizing head 5 from the high frequency oscillator 20 through the switch 23, the contact b. Thus any signal recorded on the balance magnetic stripe 1b is deleted while by the recording-reproducing head 4 the sound information signal on the main magnetic stripe 1a is recorded. Meanwhile the sound information signal on the main magnetic stripe 1a remains because the demagnetizing head 3 is inoperative. Namely, in the afore mentioned state the sound information signal on the main stripe 1a is transferred on the balance stripe 1b such that the same sound information signal is recorded on the main stripe 1a and the balance stripe 1b.

Then, after the film has once been wound back, by operating the switching dial 40 so as to set the index 40a at the mark "d" each of the switches 6, 13, 18, 21, 22 and 23 is moved to the contact d. In this state the recording-reproducing heads 2 and 4 are operative while the demagnetizing heads 3 and 5 are inoperative. The sound information signal recorded on the balance magnetic stripe 1b is reproduced by the recording-reproducing head 4, amplified by the amplifier 7 through the switch 22, the contact d, adjusted in volume by the variable resistor 8, further amplified by the main amplifier 9 and converted into an audible signal by the speaker 10. At the same time, a new sound information signal coming from the microphone 14 is amplified by means of the amplifier 15, then adjusted in volume by means of the variable resistance 16 and inputted into the amplifier 19 through the switch 18, the contact d. Then, after having been overlapped with the bias current coming from the high frequency oscillator 20, the signal amplified by means of the amplifier 19 is delivered to the recording-reproducing head 2 through the switch 13, the contact d and the switch 6, the contact d so as to be double recorded, overlapped with the signal recorded in advance on the main magnetic stripe 1a. Hereby, the balance adjustment of the double recording is carried out by varying the variable resistance 12. Namely, the signal current and the bias current supplied to the recording-reproducing head 2 is varied so as to adjust the balance.

Namely, in this case, while the sound information on the balance stripe 1b is being reproduced, the sound information signal on the main stripe 1a transferred on the balance stripe 1b is overlapped on the sound information recorded in advance on the main stripe 1a in such a manner that a new sound information signal is recorded on the main stripe 1a, whereby the sounds can be composed easily and correctly.

(2) The case a part of the sound information signal recorded in advance on the main stripe 1a is completely deleted and in its stead, a new sound information signal is recorded on the main magnetic stripe 1a.

In this case, by operating the mode change over 40 so as to set the index 40a 39 at the mark "b," each of the switches 6, 13, 18, 21, 22 and 23 is moved to the contact b. As with the double recording the original sound information signal on the main magnetic stripe 1a is transferred on the balance magnetic stripe 1b. Consequently, the same sound information signal is recorded on both of the main magnetic stripe 1a and the balance magnetic stripe 1b.

In this state, after the film has been once wound back, the film is fed forward. By operating the switching dial 40 to set the index 40a at the mark "a" each of the switches 6, 13, 18, 21, 22 and 23 is moved to the contact a. The original sound information signal recorded on the main stripe 1a is made into an audible signal. When the already recorded section of sound information arrives for deletion, the index 40a of the switching dial 39 is set at the mark c 50 that new sound information may be put into the microphone 14. So long as the index 40a is set at the mark c, the demagnetizing head 3 and the recording-reproducing heads 2 and 4 are operative while the demagnetizing head 5 is inoperative. During this period the sound information signal recorded on the balance stripe 1b is converted into an audible signal by means of the speaker 10, while new sound information coming from the microphone 14 is recorded by the head 2. The sound information signal recorded on the balance stripe 1b is being converted into an audible signal and as soon as the section on which a new sound signal is to be recorded is reached, the index 40a of the switching dial 40 is again set at the mark "a", and the sound information on the main stripe 1a is heard through the speaker and again completely deleted. The afore mentioned is repeated when a section arrives on which new sound information is to be recorded. Consequently, even in this case, when the original sound information is deleted and new sound information is again recorded on the main magnetic stripe 1a, the sound information signal is audible by means of the signal transferred on the balance stripe 1b so that the sounds can be composed quite easily and correctly.

In the case of the sound motion picture projector in accordance with the present invention, when the index 40a of the switching dial 40 is set at the mark "a" only the sound information recorded on the main stripe 1a can be reproduced by means of the speaker 10. However, when the index 40a is set at the mark "c" the sound information recorded on the main stripe 1a can completely be deleted and a new sound information can be recorded.

Further for the present embodiment, the sound recording-reproducing magnetic heads 2 and 4 are realized in one head, while it goes without saying that a sound recording magnetic head and the sound reproducing magnetic head may be manufactured separately.

What is claimed is:

1. A sound motion picture projector capable of using a film strip having a main stripe of magnetic material along the one side edge of the film, a balance stripe of magnetic material along the other side edge of the film and an optically recorded image on the film positioned between the main stripe and the balance stripe and characterizing the motion picture film, comprising;
    (a) a housing having a sound recording-reproducing location and an image reproducing location;
    (b) a film feed means in the housing for successively transporting the film through the sound recording-reproducing location and the image reproducing location;
    (c) a sound recording-reproducing means in the housing, said means including:
        a first sound recording-reproducing magnetic head means for recording a sound signal on the main stripe and reproducing the sound signal recorded on the stripe, said first head means being arranged at a position opposite to the main stripe of the film when the film passes through the sound recording-reproducing location;
        a demagnetizing head means for magnetically deleting the sound signal recorded on the main stripe, said demagnetizing head means arranged upstream of the first head means and in alignment therewith along the path taken by the main stripe of the film;
        a second sound recording-reproducing magnetic head means for recording a sound signal on the balance stripe and reproducing the sound signal recorded on the stripe, said second head means being arranged at a position opposite to the balance stripe of the film passing through the sound recording-reproducing location;
        a sound recording-reproducing control circuit means for operating the first and the second head means and the demagnetizing head means, said control circuit means having a signal output means for delivering a demagnetizing head operating signal to the demagnetizing head;
        a first signal converting means for converting the sound signal reproduced by the first and the second head means into an audible signal through the control circuit means; and
        a second signal converting means for converting audible sound into an electrical signal to be delivered into the first head means through the control circuit means;
    (d) a selector means for selecting the modes of the sound recording-reproducing means in various ways, said selector means including:
        a plural number of switches for switching the electrical circuit in the control circuit means; and
        an operation means operatively coupled with the plural number of switches for operating the switches from outside of the housing, said operation means being selectively settable into the following modes of the projector:
        (1) a first mode in which the first head means of the control circuit means is controlled to be able to reproduce a sound signal while the demagnetizing means and the second head means are disabled, and the first sound signal recorded on the main stripe is reproduced by the first head means and is made hearable by the first signal converting means;
        (2) a second mode in which the first head means is able to reproduce the sound signal, the second head means is enabled to record while the demagnetizing head is non-operative, the first sound signal recorded beforehand on the main stripe is reproduced by the first head means and is made hearable by the first signal converting means and applied to the second head means to be recorded on the balance stripe;
        (3) a third mode in which the first head means is controlled to be able to record, the output of the signal output means is able to enter an input to the demagnetizing head and the second head means is able to reproduce, and the first sound signal recorded on the balance stripe is reproduced by the second head means and is made hearable by the first signal sound converting means, and the audible sound is recorded by the second sound converting means and the first head means on the portion from which the first sound signal on the main stripe has been deleted;
        (4) a fourth mode in which the first head means is able to record, the second head means is able to reproduce, while the demagnetizing head is non-operative, and the first sound signal recorded on the balance stripe is reproduced by the second head means and is made hearable by the first signal sound converting means and simultaneously the audible sound is recorded on the main stripe overlapping the first sound signal on the main stripe by means of the second signal sound converting means and the first head means.

2. A sound motion picture projector in accordance with claim 1, wherein the film feed means includes a first feed means engageable with the film at the image reproducing location for intermittently transporting the film and a second feed means engageable with the film at the second sound recording-reproducing location for transporting the film past the sound recording-reproducing means at a substantially constant speed.

3. A sound motion picture projector in accordance with claim 2, wherein the film feed means having a drive means for actuating the first and the second feed means, said drive means includes at least a motor operatively coupled with the first feed means and the second feed means.

4. A sound motion picture projector in accordance with claim 3, wherein the film feed means includes speed regulating means for controlling the drive means to maintain a substantially constant length of film between the image reproducing location and the sound recording-reproducing location.

5. A sound motion picture projector in accordance with claim 2, wherein the film feed means includes a driving means for actuating the first and the second feed means, said driving means including a motor operatively coupled with the first feed means and a motor operatively coupled with the second feed means.

6. A sound motion picture projector in accordance with claim 1, wherein the signal output means includes a high-frequency oscillator.

7. A sound motion picture projector in accordance with claim 1, wherein the first signal converting means includes speaker.

8. A sound motion picture projector in accordance with claim 1, wherein the first signal converting means includes a dismountable ear-phone.

9. A sound motion picture projector in accordance with claim 1, wherein the second signal converting means includes a microphone.

10. A sound motion picture projector in accordance with claim 9, wherein the microphone is dismountable.

11. A motion picture projector capable of using a film strip having a main stripe of magnetic material along the one side edge of the film, a balance stripe of magnetic material along the other side edge of the film and an optically recorded image on the film positioned between the main stripe and the balance stripe and characterizing the film, comprising:
(a) a housing having a sound recording-reproducing location and an image reproducing location;
(b) an image gate means for defining the passage of the film at the image reproducing location, said means being mounted in the housing;
(c) an image reproducing means for reproducing the image recorded on the film passing through the image gate means, said means being arranged at the image reproducing location and including:
an illumination means for emitting the projection light to the film;
a projecting optical means for forming an image out of the light coming from the illumination means through the film;
(d) a feed means engageable with the film at the image reproducing location for intermittently transporting the film past the image gate means;
(e) a sound recording-reproducing means in the housing, said means including:
a first sound recording-reproducing magnetic head means for recording a sound signal on the main stripe and reproducing the sound signal recorded on the strip, said first head means being arranged at a position opposite to the main stripe of the film passing through the sound recording-reproducing location;
a demagnetizing head for magnetically deleting the sound signal recorded on the main stripe, said demagnetizing head means arranged upstream of the first head means so as to make a line therewith along the path for the main stripe of the film;
a second sound recording-reproducing magnetic head means for recording the sound signal on the balance stripe and reproducing the sound signal recorded on the stripe, said second head means being arranged at a position opposite to the balance stripe of the film passing through the sound recording-reproducing location;
a sound recording-reproducing control circuit means for controlling the first and the second head means and the demagnetizing head means, said control circuit means presenting a signal output means for delivering a demagnetizing head operating signal to the demagnetizing head;
a first signal converting means for converting the sound signal reproduced by means of the first and the second head means into an audible signal through the control circuit means;
a second signal converting means for converting audible sound into an electrical signal to be delivered into the first head means through the control circuit means;
(f) a second feed means engageable with the film at the sound recording-reproducing location for transporting the film past the sound recording-reproducing means at a substantially constant speed;
(g) a drive means for actuating the first and the second feed means;
(h) a selector means for switching the modes of the sound recording-reproducing means in various ways, said means including:
a plural number of switches for switching over the electrical circuits in the control circuit means;
an operation means operatively coupled with the plural number of switches so as to be in a position to operate the switches from outside of the housing, said means being selectively overchangeable at least into the following mode of the projector:
(1) a first mode in which the electrical connection of the control circuit means is controlled in such a manner that only the first head means is able to reproduce a sound signal while the second head means and the demagnetizing head means are disabled, whereby the signal reproduced by means of the first head means is inputted into the first signal converting means;
(2) a second mode in which the electrical connection of the control circuit means is controlled in such a manner that the output signal from the signal output means can be inputted into the demagnetizing head means and the first head means is able to record a sound signal whereby the output from the second signal converting means is inputted into the first head means, while the second head means is able to reproduce a sound signal whereby the reproduced signal is inputted into the first signal converting means;

(3) a third mode in which the electrical connection of the control circuit means is controlled in such a manner that the first head means is able to reproduce a sound signal and the second head means is able to record a sound signal while the demagnetizing means remains in the non-operative state whereby the sound signal reproduced by means of the first head means is delivered to the signal converting means and the second head means; and (4) a fourth mode in which the electrical connection of the control circuit means is controlled in such a manner that the first head means is able to record a sound signal and the second head means is able to reproduce a sound signal, so that the sound signal reproduced by the second head means is delivered to the first signal converting means while the output signal from the second signal converting means is delivered to the first head means for overlapping the output from the second converting means on the signal on the main stripe.

12. A sound motion picture projector in accordance with claim 11, wherein the first head means, the second head means and the demagnetizing head means are formed as a single unit.

13. A sound motion picture projector in accordance with claim 11, wherein the sound recording-reproducing means includes a balance stripe demagnetizing head means for magnetically deleting the sound signal recorded on the balance stripe, said demagnetizing head means being arranged upstream of the second head means so as to be a line therewith along the path of the balance stripe of the film and being brought into the operative state only when the manual operation means has brought the plural number of switches into the third mode.

14. A sound motion picture projector in accordance with claim 11, wherein the drive means includes at least a motor operatively coupled with the first and the second feed means.

15. A sound motion picture projector in accordance with claim 14, wherein the drive means includes a motor operatively coupled with the first feed means and a motor operatively coupled with the second feed means.

16. A sound motion picture projector in accordance with claim 15, wherein the drive means includes a speed regulating means for controlling the first feed means to maintain a substantially constant length of film between the image reproducing location and the sound recording-reproducing location.

17. A sound motion picture projector in accordance with claim 11, wherein the signal output means includes a high-frequency oscillator.

18. A sound motion picture projector in accordance with claim 11, wherein the first signal converting means includes a speaker.

19. A sound motion picture projector in accordance with claim 11, wherein the first signal converting means includes a dismountable ear-phone.

20. A sound motion picture projector in accordance with claim 11, wherein the second signal converting means includes a microphone.

21. A sound motion picture projector in accordance with claim 20, wherein the microphone is dismountable.

* * * * *